2,671,988

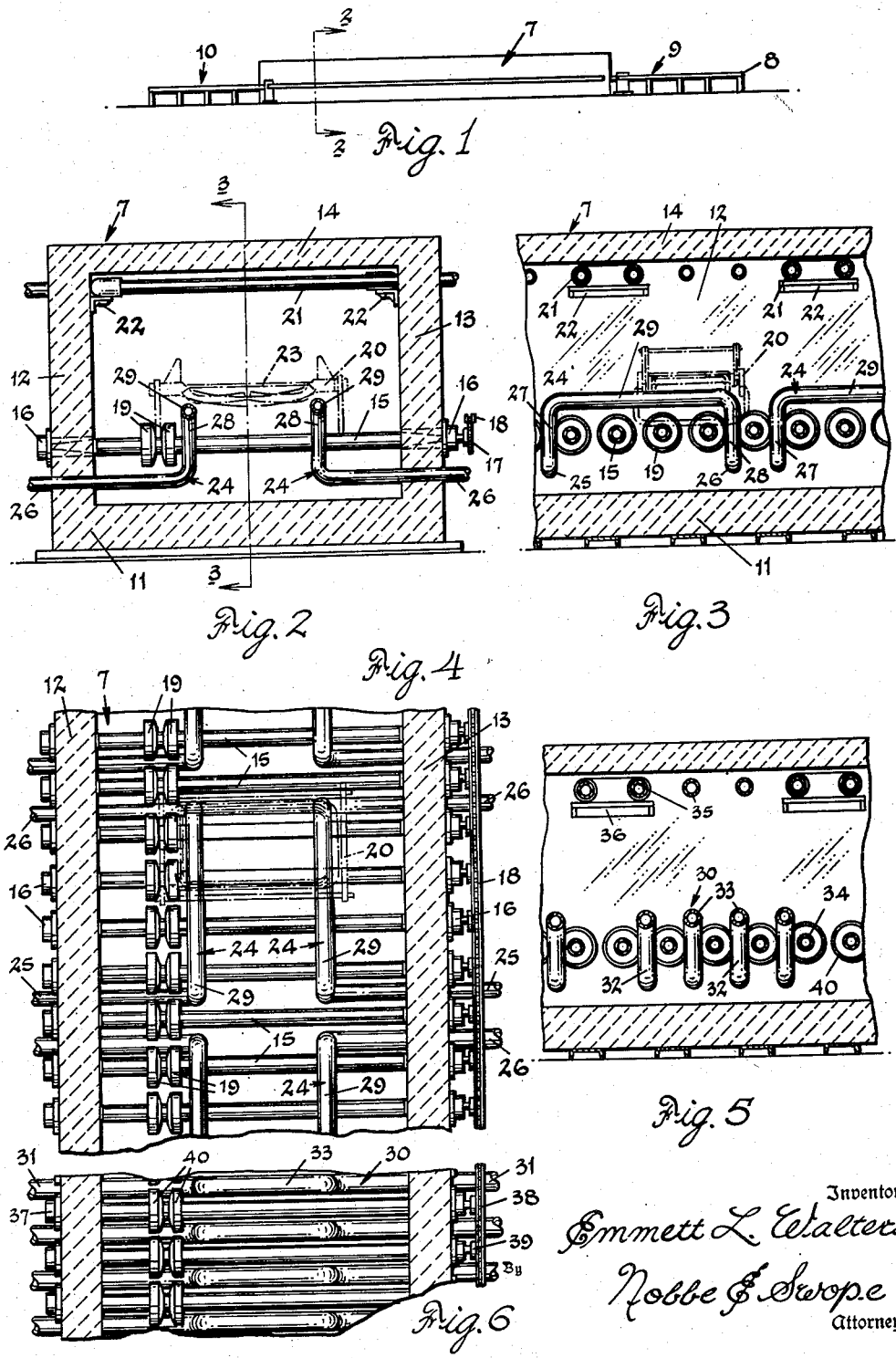
March 16, 1954 — E. L. WALTERS — 2,671,988
APPARATUS FOR BENDING GLASS
Filed Dec. 26, 1950
Inventor
Emmett L. Walters
Nobbe & Swope
Attorneys Patented Mar. 16, 1954

UNITED STATES PATENT OFFICE 2,671,988

APPARATUS FOR BENDING GLASS

Emmett L. Walters, Toledo, Ohio, assignor to Libbey-Owens-Ford Glass Company, Toledo, Ohio, a corporation of Ohio Application December 26, 1950, Serial No. 202,672

9 Claims. (Cl. 49—47)

1

The present invention relates broadly to the bending of glass sheets or plates and more particularly to an improved type furnace construction for facilitating the bending operation.

An important object of this invention is the provision of a bending furnace whereby a more uniform heating of the glass sheet or plate may be effected and in consequence, a more uniform settling of the sheet into the shaping mold accomplished so that said sheet will accurately conform to the curvature thereof throughout its entire area.

Another object of the invention is to provide an improved type bending furnace by the use of which glass sheets or plates can be accurately bent to a predetermined curvature in a thoroughly practical and efficient manner so as to reduce the liability of breakage of the glass and likewise minimize the setting up of stresses and strains therein during the bending operation.

A further object of the invention is the provision of a bending furnace wherein transversely extending heating means are positioned adjacent the top of the furnace and wherein longitudinally or transversely extending heating means are located below the path of the bending mold above the conveyor means thereby effecting a more uniform heating of the glass sheet or plate without injury to the conveyor means.

Other objects and advantages of the invention will become more apparent during the course of the following description when taken in connection with the accompanying drawings.

In the drawings, wherein like numerals are employed to designate like parts throughout the same:

Fig. 1 is a side elevation of a tunnel-type furnace suitable for carrying out the invention;

Fig. 2 is a transverse section taken substantially along the line 2—2 of Fig. 1;

Fig. 3 is a longitudinal vertical section taken substantially along the line 3—3 of Fig. 2;

Fig. 4 is a horizontal detail view of a portion of the furnace shown in Fig. 2;

Fig. 5 is a longitudinal detail view of a furnace showing a modified form of heating unit; and Fig. 6 is a horizontal detail view of a portion of the furnace in Fig. 5 showing a modified form of heating unit.

Referring now to the drawings, and more particularly to Fig. 1, there is shown a tunnel-type substantially rectangular continuous bending furnace 7 through which the shaping molds with glass sheets or plates carried thereupon are designed to pass. Extending longitudinally throughout the furnace are conveyor means 8, that section adjacent the entrance of the furnace constituting a loading station 9 at which the unbent glass sheets may be positioned upon the molds and that section adjacent the exit of the bending furnace constituting a station 10 at which other means well known in the art, such as cooling means, may be located.

A transverse sectional view through the furnace 7 is shown in Fig. 2, and upon reference thereto it will be seen that the furnace comprises a bottom 11, opposite vertical side walls 12 and 13 and a top or roof 14. Constituting a part of the conveyor means 8 and extending through the side walls of the furnace are a plurality of horizontally disposed tubular conveyor rollers 15 which are rotatably journaled in bearings 16 suitably affixed to the exterior surfaces of the side walls. Mounted upon one protruding end of the conveyor rollers are sprockets 17 over which are trained a chain 18 driven by and suitably connected to a power mechanism (not shown). By means of this chain and sprocket linkage the mold frames and glass sheets mounted thereupon progress through the bending furnace at uniform speed, thereby assuring an even progressively increasing heating of the glass sheet throughout the bending sections of the furnace.

As may be seen in Figs. 2 and 4, each spaced conveyor roller 15 is fitted with a pair of conical collars 19, said collars defining a track for one of the legs of the mold frame 20 for guiding the mold frames along their intended path.

The substantially rectangular oven or furnace 7 is heated by a plurality of U-shaped heating tubes 21 extending transversely across the furnace adjacent the top 14, the ends of said tubes extending through the side walls 12 and 13 of the furnace. The tubes are suitably supported on their bottom surfaces within the furnace, as by angle braces 22. The tubes or burners are preferably gas fired and a fair portion of the developed heat is in the form of radiant energy directed toward the upper surface of the glass sheet 23.

In order to furnish additional heat, directed particularly to those areas of desired greater curvature, there is herein provided elongated tubular heating members 24 located adjacent the bottom 11 of the furnace and extending longitudinally thereof and parallel to the path of the molds. Each tube 24 comprises transverse sections 25 and 26 extending through the side walls 12 and 13 of the furnace and adjacently parallel the bottom thereof, vertical sections 27 and 28 extending upwardly from said transverse sections, and a horizontal section 29 running between the vertical sections and longitudinally with respect to the furnace. The various sections of the heating tubes 24 may be joined together by elbow joints or formed from one pipe bent to the desired shape.

As may be seen in Figs. 2 and 3, the transverse sections 25 and 26 enter the side walls of the furnace at locations below the conveyor rollers 15 and by means of the vertical sections 27 and 28, extend upwardly beyond the conveyor rollers and define the position of the horizontal section 29 at a substantial distance above said conveyor rollers, below the path of the mold, and parallel to the bottom of the furnace. By locating the lower heating units as above described a more efficient source of heat at the bottom of the mold is provided, any possibility of excessive heating of the conveyor rollers is substantially eliminated, and the further possibility of baffling or shielding of the heat source by the conveyor rollers rendered substantially remote.

The relative position of a typical mold frame 20 with respect to the heating members 24 is indicated in Fig. 2. Thus it may be seen that as heat is radiated from the horizontal sections 29 of the members 24, direct heating of the conveyor rollers and consequent injurious effects thereon are no longer possible. Furthermore, heat emitted from these tubes is directed toward those areas of the glass sheet wherein the greatest bend is desirable. Thus, as to the mold shown by way of example, wherein a more severe bend is desired adjacent the end portions, a greater amount of heat is directed to those areas and the more rapid bending thereof readily accomplished.

Utilization of the longitudinally extending heating tubes of this invention allows for considerable flexibility in the formation of the desired curves or bends. As has been noted above, relatively sharp bends adjacent the ends of the glass sheet may be successfully accomplished by two substantially parallel rows of burners or tubes. Should it be desired to effect a relatively sharp bend or curve along only one marginal edge, that area may be additionally heated by one row of the present tubes and the other marginal edge not heated to the same extent by turning off that row of heating tubes.

In addition, in the event that a relatively sharp bend or curve in the central area of the glass sheet or plate is sought, at least two additional rows of parallel heating tubes may be located between the tubes shown. Thus, to effect the central area bend the two outer rows of tubes would not be in operation, the desired additional heat being furnished by the two inner rows of heating tubes or burners. It may thus be seen that almost any conceivable type bend or curve may be accomplished by employing one or more rows of heating tubes in conjunction with a suitably shaped mold.

The heating tubes or burners 24 serve the additional purpose of supplying heat to the entire furnace to raise the temperature level throughout the bending area. This function is performed in conjunction with the heating tubes 21 located adjacent the top or roof 14 of the furnace. Thus, as heat is emitted by the heating tubes 24 it strikes the bottom area of the glass sheet 23 and a portion thereof reflected backwardly and radiated throughout the furnace, thereby combining with the heat supplied by the upper heating tubes 21 to raise the temperature of the entire furnace to the desired bending level.

Upon reference to Figs. 3 and 4 it will be seen that the transverse sections 25 and 26 of the heating tubes 24 enter the side walls of the furnace at locations whereby the horizontal sections 29 longitudinally traverse four conveyor rollers. Since it is desirable, as is well known in the art, to accurately control the temperature of the various regions of the furnace up to the bending temperature of the glass, it has been found that greater accuracy may be attained by a method of temperature control spaced at locations approximately equal to the width of four conveyor rollers. However, it will be appreciated that under certain circumstances it may be desirable to control the temperature at less or more frequent intervals and that the invention is not limited to the span of four conveyor rollers.

A modified form of the invention is shown in Figs. 5 and 6 wherein is provided a plurality of elongated tubular heating members 30 with the transverse sections 31 thereof entering through the side walls of the furnace, merging into vertical sections 32 and terminating in a horizontal section 33. Thus, each burner tube is of inverted substantially U-shape, the base of the U constituting the horizontal section, the legs thereof being the vertical sections and perpendicular extensions from the legs of the U constituting the transverse sections which extend through the side walls of the furnace.

The transversely extending heating tubes 30 are of particular advantage in the formation of a relatively sharp bend in the central area of the glass sheet or plate. In addition to supplying heat throughout the entire furnace, as indicated above in connection with the longitudinally extending heating tubes 24, the burner sections 33 of the transverse heating tubes 30 emit heat toward the central area of the glass sheet and cause that area of proposed greater curvature to reach bending temperature at substantially the same instant as the other portions of the sheet, thereby assuring substantially simultaneous conformity of all portions of the glass sheet to the curvature of the mold surface with a minimum of sliding thereon.

As was noted above with reference to the longitudinally extending tubes 24, the transverse heating tubes 30 are located above the conveyor rollers 34 below the path of the mold, thereby substantially preventing excessive heating of the rollers and reducing, if not eliminating, baffling or shielding effects by the rollers. Furthermore, by the positioning of the heating tubes in closer proximity to the bottom of the mold, more uniform and efficient heating of the desired area of the glass sheet results without injurious effects upon the lower surface of said sheet. In addition, by locating the source of the heat closer to the glass sheet to be curved, the bending of the glass may be expedited or hastened without harmful effects thereto. Thus it is possible, by utilizing the heating tubes or burners of this invention, to either reduce the normal length of the bending furnace or to reduce the input of fuel gas to the heating means, either one or both diminishing the time and cost of the bending operation.

As may be seen in Figs. 5 and 6, in a modified form of the invention the heating tubes 30 extend transversely above and between the conveyor rollers 34 in parallel groups of four tubes. As has been noted above with reference to the longitudinally extending heating tubes 24, this particular arrangement has been found to permit more uniform regulation of the temperature of the various sections of the bending furnace. However, it is to be understood that certain bending operations may require more or less frequent temperature control and that the invention is not limited to the coupling arrangement indicated. For example, in the bending of heavier plates of glass or in the formation of relatively sharp bends, it may be desirable to locate the heating tubes above and between each conveyor roller in order to supply the additional heat desired.

For the purpose of supplying heat throughout the furnace in conjunction with the lower heating tubes 30, and more particularly to direct heat by radiation to the upper surface of the glass sheet, there is provided in the modified form U-shaped heating tubes 35 extending transversely of the furnace, adjacent the top thereof and suitably supported on angle braces 36, substantially as shown in the preferred form of the invention in Fig. 2.

The conveyor rollers 34 are mounted in substantially the same manner as has been described above. That is, as shown in Figs. 5 and 6, the conveyor rollers are rotatably journaled in bearings 37 and driven by a chain 38 trained over sprockets 39 carried upon one projecting end of the rollers. Serving to guide the mold frames along their intended path are pairs of conical collars 40 fitted upon the conveyor rollers 34.

Although the mold frame illustrated and described above is of the metal ring type, it will be appreciated that both the longitudinally and transversely extending heating tubes or burners are of equal application in the formation of curved glass sheets or plates regardless of the type mold utilized. That is, the present invention may be effectively utilized with metal molds of the ring or undercut type, sand molds, and other types associated with horizontal bending operations.

It is also to be understood, that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for bending glass sheets, a longitudinally extending oven, conveyor means arranged within the oven for supporting bending molds carrying glass sheets to be bent and for transporting said molds forwardly through the oven, and means for heating the glass sheets as they are carried through the oven comprising heating elements having a portion located beneath the conveyor means and another portion thereof located beneath the path of travel of the glass sheets and above said conveyor means, both of said portions positively radiating heat upwardly toward the bottom surface of the glass sheets.

2. In apparatus for bending glass sheets, a longitudinally extending oven, conveyor means arranged within the oven for supporting bending molds carrying glass sheets to be bent and for transporting said molds forwardly through the oven, and means for heating the glass sheets as they are carried through the oven comprising elongated tubular members having a portion located beneath the conveyor means and another portion thereof located beneath the path of travel of the glass sheets and above said conveyor means, both of said portions extending substantially parallel to the floor of the oven.

3. In apparatus for bending glass sheets, a longitudinally extending oven, conveyor means arranged within the oven for supporting bending molds carrying glass sheets to be bent and for transporting said molds forwardly through the oven, means on said conveyor for maintaining the molds in longitudinal alignment, and means for heating the glass sheets as they are carried through the oven comprising elongated tubular members having a portion located beneath the conveyor means and another portion thereof located beneath the path of travel of the glass sheets and above said conveyor means, both of said portions extending substantially parallel to the floor of the oven.

4. In apparatus for bending glass sheets, a longitudinally extending oven, conveyor means arranged within the oven for supporting bending molds carrying glass sheets to be bent and for transporting said molds forwardly through the oven, and means for heating the glass sheets as they are carried through the oven comprising heating members carried adjacent the roof of said oven and heating members having a portion located beneath the conveyor means and another portion thereof located beneath the path of travel of the glass sheets and above said conveyor means, said last-named members including a section joining said portions and passing upwardly beyond the conveyor means.

5. In apparatus for bending glass sheets, a longitudinally extending oven, conveyor means arranged within the oven for supporting bending molds carrying glass sheets to be bent and for transporting said molds forwardly through the oven, and means for heating the glass sheets as they are carried through the oven comprising tubular members passing through the walls of said oven and extending upwardly beyond the conveyor means beneath the path of travel of the glass sheets and substantially parallel the floor of said oven.

6. In apparatus for bending glass sheets, a longitudinally extending oven comprising top, bottom and side walls; conveyor means arranged within the oven for supporting bending molds carrying glass sheets to be bent and for transporting said molds forwardly through the oven; and means for heating the glass sheets as they are carried through the oven comprising tubular members passing through the side walls of the oven beneath said conveyor means and extending upwardly and horizontally above the conveyor means and beneath the path of travel of the glass sheets.

7. In apparatus for bending glass sheets, a longitudinally extending oven comprising top, bottom and side walls; conveyor means arranged within the oven for supporting bending molds carrying glass sheets to be bent and for transporting said molds forwardly through the oven; and means for heating the glass sheets as they are carried through the oven comprising elongated tubular members carried adjacent the top wall of said oven and a plurality of tubular elements including transverse sections passing through the side walls of said oven beneath the conveyor means, vertical sections connected thereto and extending upwardly beyond said conveyor means, and horizontal sections extending between said vertical sections and disposed above the conveyor means beneath the path of travel of the glass sheets.

8. In apparatus for bending glass sheets, a longitudinally extending oven comprising top, bottom and side walls; conveyor means arranged within the oven for supporting bending molds carrying glass sheets to be bent and for transporting said molds forwardly through the oven; and means for heating the glass sheets as they are carried through the oven comprising a plurality of tubular elements including transverse sections passing through the side walls of said oven beneath the conveyor means, vertical sections connected thereto and extending upwardly beyond said conveyor means, and horizontal sections disposed longitudinally of the oven and above the conveyor means beneath the path of travel of the glass sheets, said horizontal sections spanning a portion of the conveyor means; and synchronizing and driving means for said conveyor means.

9. In apparatus for bending glass sheets, a longitudinally extending oven comprising top, bottom and side walls; conveyor means arranged within the oven for supporting bending molds carrying glass sheets to be bent and for transporting said molds forwardly through the oven; and means for heating the glass sheets as they are carried through the oven comprising a plurality of tubular elements including transverse sections passing through the side walls of said oven beneath the conveyor means, vertical sections connected thereto and extending upwardly beyond said conveyor means, and horizontal sections disposed transversely of the oven and above the conveyor means beneath the path of travel of the glass sheets; and synchronizing and driving means for said conveyor means.

EMMETT L. WALTERS.

References Cited in the file of this patent

UNITED STATES PATENTS

| Number | Name | Date |
|---|---|---|
| 1,566,563 | Ross | Dec. 22, 1925 |
| 1,791,404 | Fahrenwald | Feb. 3, 1931 |
| 2,111,392 | Galey | Mar. 15, 1938 |
| 2,176,999 | Miller | Oct. 24, 1939 |
| 2,213,406 | Paddock et al. | Sept. 3, 1940 |
| 2,561,529 | Mongan et al. | July 24, 1951 |